US009473404B2

(12) United States Patent
Anand

(10) Patent No.: US 9,473,404 B2
(45) Date of Patent: Oct. 18, 2016

(54) SYMMETRIC FLOW PROCESSING IN A SOFTWARE-DEFINED NETWORKING (SDN) SYSTEM

(71) Applicant: Telefonaktiebolaget L M Ericsson (publ), Stockholm (SE)

(72) Inventor: Prashant Anand, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 124 days.

(21) Appl. No.: 14/604,516

(22) Filed: Jan. 23, 2015

(65) Prior Publication Data
US 2016/0218973 A1   Jul. 28, 2016

(51) Int. Cl.
*H04L 12/741* (2013.01)

(52) U.S. Cl.
CPC .................. *H04L 45/745* (2013.01)

(58) Field of Classification Search
CPC .................................................. H04L 45/745
See application file for complete search history.

(56) References Cited

U.S. PATENT DOCUMENTS

| 2014/0010083 | A1* | 1/2014 | Hamdi | H04L 47/193 370/235 |
| 2014/0177634 | A1* | 6/2014 | Jiang | H04L 45/64 370/392 |
| 2014/0341030 | A1* | 11/2014 | Kuo | H04L 47/122 370/235 |

OTHER PUBLICATIONS

"OpenFlow Switch Specification," Open Networking Foundation, Version 1.3.1 (Wire Protocol 0x04), Sep. 6, 2012, 128 pages.
"OpenFlow Switch Specification," Open Networking Foundation, Version 1.3.4 (Protocol version 0x04), Mar. 27, 2014, pp. 1-171.
J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
T. Socolofsky, et al., "A TCP/IP Tutorial," Jan. 1991, 28 pages, Network Working Group, Request for Comments: 1180.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.

(Continued)

*Primary Examiner* — Andrew Lai
*Assistant Examiner* — Sumitra Ganguly
(74) *Attorney, Agent, or Firm* — Patent Portfolio Builders, PLLC

(57) ABSTRACT

In one embodiment, a method implemented in a software-defined networking (SDN) system includes determining that a packet is to be forwarded by a flow table that includes at least two sets of instructions in flow table entries. The method continues with determining values of a plurality of match key components extracted from the packet to match the flow table, where the plurality of match key components contains at least a pair of match key components in a same type, wherein values of the pair are determined based on numerical measures of the pair. The method continues with searching the flow table to find a matching entry for the packet and, upon finding it, selecting one of the at least two sets of instructions of the matching entry following the determination of the values of the plurality of match key components, and perform the selected set of instructions on the packet.

20 Claims, 6 Drawing Sheets

(56) References Cited

OTHER PUBLICATIONS

S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.

D. Black, "Differentiated Services and Tunnels," Oct. 2000, 14 pages, Network Working Group, Request for Comments: 2983, The Internet Society.

K. Nichols, et al., "Definition of Differentiated Services Per Domain Behaviors and Rules for their Specification," Apr. 2001, 24 pages, Network Working Group, Request for Comments: 3086, The Internet Society.

D. Black, et al., "Per Hop Behavior Identification Codes," Jun. 2001, 8 pages, Network Working Group, Request for Comments: 3140, The Internet Society.

B. Davie, et al., "An Expedited Forwarding PHB (Per-Hop Behavior)," Mar. 2002, 16 pages, Network Working Group, Request for Comments: 3246, The Internet Society.

A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

D. Grossman, "New Terminology and Clarifications for Diffserv," Apr. 2002, 10 pages, Network Working Group, Request for Comments: 3260, The Internet Society.

F. Baker, et al., "Management Information Base for the Differentiated Services Architecture," May 2002, 116 pages, Network Working Group, Request for Comments: 3289, The Internet Society.

Y. Bernet, et al., "An Informal Management Model for Diffserv Routers," May 2002, 56 pages, Network Working Group, Request for Comments: 3290, The Internet Society.

K. Chan, et al., "Differentiated Services Quality of Service Policy Information Base," Mar. 2003, 96 pages, Network Working Group, Request for Comments: 3317, The Internet Society.

B. Fenner, et al., "Management Information Base for the User Datagram Protocol (UDP)," Jun. 2005, 19 pages, Network Working Group, Request for Comments: 4113, The Internet Society.

S. Kent, et al., "Security Architecture for the Internet Protocol," Dec. 2005, 101 pages, Network Working Group, Request for Comments: 4301, The Internet Society.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

E. Rosen, et al., "BGP/MPLS IP Virtual Private Networks (VPNs)," Feb. 2006, 47 pages, Network Working Group, Request for Comments: 4364, The Internet Society.

J. Babiarz, et al., "Configuration Guidelines for DiffServ Service Classes," Aug. 2006, 57 pages, Network Working Group, Request for Comments: 4594, The Internet Society.

K. Kompella, et al., "Virtual Private LAN Service (VPLS) Using BGP for AutoDiscovery and Signaling," Jan. 2007, 28 pages, Network Working Group, Request for Comments: 4761, The IETF Trust.

M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF).

Request for Comments: 5865, IETF Trust and the persons identified as the document authors.

* cited by examiner

SYMMETRIC FLOW PROCESSING IN A SOFTWARE-DEFINED NETWORKING (SDN) SYSTEM

FIELD OF INVENTION

The embodiments of the invention are related to the field of networking. More specifically, the embodiments of the invention relate to a method and system to performing symmetric flow processing in a software-defined networking (SDN) system.

BACKGROUND

Software-Defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

In a SDN system, a network element generally utilizes a set of flow tables to forward packets of traffic flows. Each flow table contains a set of flow table entries, each flow table entry including match fields to match incoming packets and a set of instructions to perform upon a match is found. Once a packet matches a flow table entry, the network element causes the set of instructions of the matching flow table entry to be performed on the packet. A match key is defined for a flow table and it generally contains several match key components (sometimes referred to as key compositions). The values of the match key components in a packet are extracted and matched to the values of match fields of the flow table.

For related traffic flows, it is not uncommon for the match key compositions of flow tables to share some similarities. For example, for communications between a client network element and a server network element, a flow table A may contain a match key of media access control address (MAC) source and destination, say the match key of {client's MAC address, server's MAC address}, where the source MAC is for the client network element and the destination MAC is for the destination network element. Flow table A may be for a traffic flow from the client network element to the server network element. For a traffic flow in the opposite direction, from the server network element to the client network element, a flow table B may have the match key of {server's MAC address, client's MAC address}. Flow tables A and B are two distinct flow tables in a network element, even though they contain the same key components, albeit in different orders.

SUMMARY

A method for symmetric flow processing is disclosed. The method is implemented in a network device coupled to a software-defined networking (SDN) system, where the SDN system contains a SDN controller managing the network device. The method includes determining that a packet is to be forwarded by a flow table that includes at least two sets of instructions in flow table entries. The method continues with determining values of a plurality of match key components extracted from the packet to match the flow table, where the plurality of match key components contains at least a pair of match key components in a same type, where values of the pair are determined based on numerical measures of the pair. The method continues with searching the flow table to find a matching entry for the packet and, upon finding the matching entry for the packet, selecting one of the at least two sets of instructions of the matching entry following the determination of the values of the plurality of match key components, and perform the selected set of instructions on the packet.

A network device for symmetric flow processing is disclosed. The network device is coupled to a SDN system, where the SDN system contains a SDN controller managing the network device. The network device determines that a packet is to be forwarded by a flow table that includes at least two sets of instructions in flow table entries. The network device determines values of a plurality of match key components extracted from the packet to match the flow table, where the plurality of match key components contains at least a pair of match key components in a same type, where values of the pair are determined based on numerical measures of the pair. The network device searches the flow table to find a matching entry for the packet; upon finding the matching entry for the packet, the network device selects one of the at least two sets of instructions of the matching entry following the determination of the values of the plurality of match key components and performs the selected set of instructions on the packet.

A non-transitory machine-readable medium for symmetric flow processing is disclosed. The non-transitory machine-readable medium has instructions stored therein, which when executed by a processor, cause the processor to perform operations in a network device coupled to a SDN system, where the SDN system contains a SDN controller managing the network device. The operations include determining that a packet is to be forwarded by a flow table that includes at least two sets of instructions in flow table entries. The operations continue with determining values of a plurality of match key components extracted from the packet to match the flow table, where the plurality of match key components contains at least a pair of match key components in a same type, where values of the pair are determined based on numerical measures of the pair. The operations continue with searching the flow table to find a matching entry for the packet and, upon finding the matching entry for the packet, selecting one of the at least two sets of instructions of the matching entry following the determination of the values of the plurality of match key components, and perform the selected set of instructions on the packet.

Embodiments of the techniques provide ways for a SDN system to consolidate multiple flow tables into one, thus make creating the flow tables and packet matching more efficient in the SDN system.

BRIEF DESCRIPTION OF THE DRAWINGS

The present invention is illustrated by way of example, and not by way of limitation, in the figures of the accompanying drawings in which like references indicate similar elements.

DETAILED DESCRIPTION

Figure 1A:
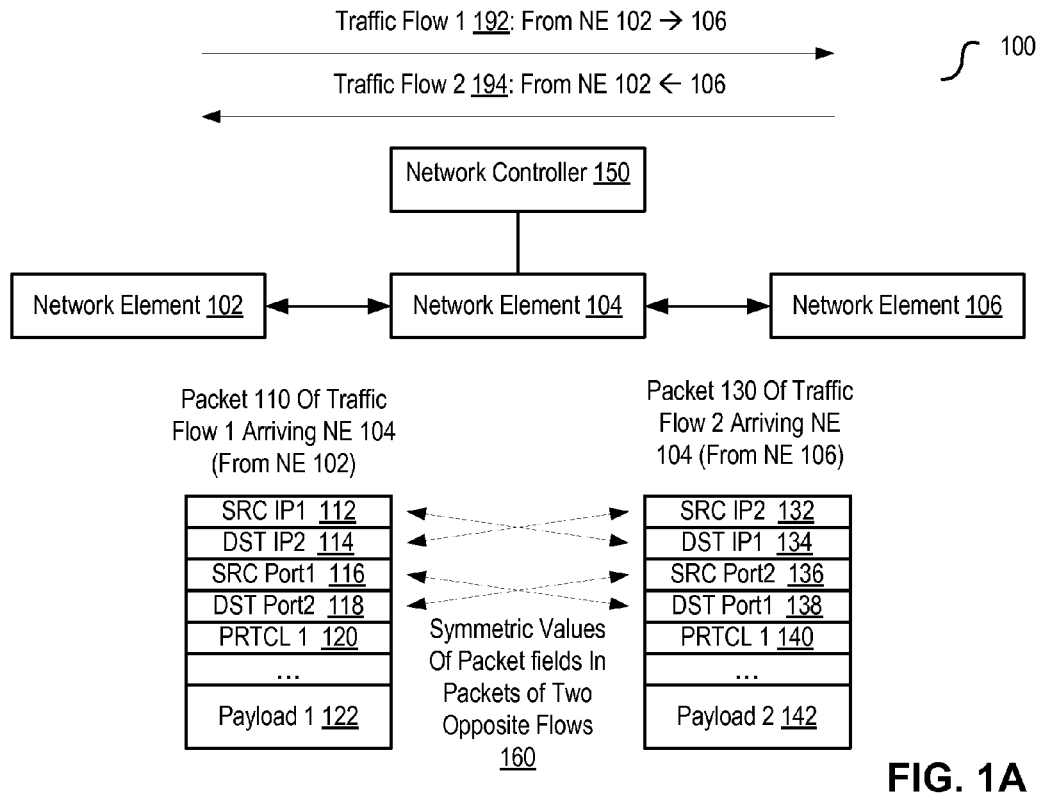
FIG. 1A illustrates traffic flows in a SDN system where symmetric flow processing may be applicable.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. A network device is an electronic device. A network element, as explained in more details herein below, is implemented in one or more network devices and a network device may include one or more network elements.

SDN Operations of Symmetric Flows

In a SDN system, packets are forwarded through traffic flows (or simply referred to as flows), and a network element forwards the flows based on its forwarding tables, which are managed by a network controller (also referred to as a SDN controller, the terms are used interchangeably in the specification). A flow may be defined as a set of packets whose headers match a given pattern of bits. A flow may be identified by a set of attributes embedded to one or more packets of the flow. An exemplary set of attributes includes source and destination MAC addresses as discussed herein above. The flow is identified by the Open System Interconnection (OSI) layer 2 characteristics, thus often referred to as a L2 flow. Another exemplary set of attributes includes a 5-tuple (source and destination IP addresses, source and destination TCP/UDP ports, and a protocol type), which identifies the OSI layer 3 characteristics of the flow, which is often referred to as L3 flow. In forwarding packets of traffic flows, network elements of a SDN system match the packets against flow tables, which have defined match key components, and perform operations per instructions of matching flow table entries.

The values of match key components of packet headers of packets are matched against match fields of flow entries in flow tables. The match fields may take the formats defined in the OpenFlow protocol, where the match fields are described using the OpenFlow Extensible Match (OXM) format, which is a type-length-value (TLV) format. The OXM TLV for a flow table can be long, for example, between 5 and 259 bytes. As each flow table entry contains match fields, and a network element may contain millions of flow table entries, the match fields (e.g., in the format of OXM TLVs), can take significant storage space. In addition, the network controller needs to manage the creation and maintenance of the flow tables and flow table entries, thus, it will be advantageous to reduce the number of flow tables and flow table entries.

Traffic flows in a SDN system are often related. For example, as discussed herein above, the two traffic flows between a client network element and a server network element are related, and the match key components of the associated two flow tables are the same for the L2 flow. Similarly, for a L3 flow between a client network element and a server network element, the match key components of the two associated two flow tables can be a same 5-tuple such as {client's IP address, server's IP address, client's IP port, server's IP port, protocol}. Generally, flow tables may contain same key components for related traffic flows in a SDN system. For example, for a SDN system in compliance with the OpenFlow protocol, two or more flow tables may contain the same OXM match fields such as the following:

(Source IP address, Destination IP address, Other OpenFlow OXM match field)
(Source IP address, Destination IP address, Source Port, Destination Port, Other OpenFlow OXM match field)
(Source MAC address, Destination MAC address, Source IP address, Destination IP address, Other OpenFlow OXM match field)
(Source MAC address, Destination MAC address, Other OpenFlow OXM match field)

The specified OXM match fields above appear in more than one flow table of a network element. For example, a source IP address for one flow table to match a flow from one direction (e.g., a client to a server) appears as a destination IP address for another flow table to another flow from the opposite direction (e.g., the server to the client). These match fields and match key components may be referred to as symmetric match fields and match key components. It is to be noted that each pair of the symmetric match fields and symmetric match key components are a pair of match fields and match key components of the same data type (e.g., IP address, MAC address, or TCP/UDP port) but with different values. FIG. 1A illustrates traffic flows in a SDN system where symmetric flow processing may be applicable.

System 100 is a SDN system containing a network controller 150. Network controller 150 manages a set of network elements, including network elements 102-106. The detailed operations of a network controller and network elements are discussed herein below in relation to FIGS. 6A-F. Two traffic flows are processed through system 100. Traffic flow 1 at reference 192 goes from network element 102 to network element 106. Traffic flow 2 at reference 194 goes from network element 106 to network element 102.

A packet 110 of traffic flow 1 arrives at network element 104 from network element 102 to network element 106. Packet 110 contains a 5-tuple in its header: a source IP address 1 (SRC IP1) at reference 112, a destination IP address 2 (DST IP2) at reference 114, a source port 1 (SRC Port1) at reference 116, a destination port 2 (DST Port2) at reference 118, and protocol 1 (PRTCL 1) at reference 120. Packet 110 also includes payload 1 at reference 122. In the opposite direction, a packet 130 of traffic flow 2 arrives at network element 104 from network element 106 to network element 102. Packet 130 contains another 5-tuple in its header: a SRC IP2 at reference 132, a DST IP1 at reference 134, a SRC Port2 at reference 136, a DST Port1 at reference 138, and PRTCL 1 at reference 140. Packet 130 also includes payload 2 at reference 142. It is to be noted that the packets of the two flows have 5-tuples with the same components, but the order of the components are different. As illustrated at reference 180, the packets of two opposite flows have symmetric values in some fields. When the flows are characterized by the 5-tuples, packets of the flows may be forwarded based on the 5-tuples. That is, the 5-tuples may be used as key components.

It is known that match key components are used to match flow table entries through matching field such as match fields in the OpenFlow protocol. Each flow table entry may also include a set of instructions to be performed on a matched packet, a set of counters to be updated upon processing the packet, a set of timeout values indicating expiration of a traffic, a priority field indicating the matching precedence of the flow table entry. For processing the two flows, network element 104 may create two flow tables. In contrast, embodiments of the invention may consolidate the two flow tables and utilize only a single flow table for packet forwarding.

Symmetric Flow Table

Figure 1B:
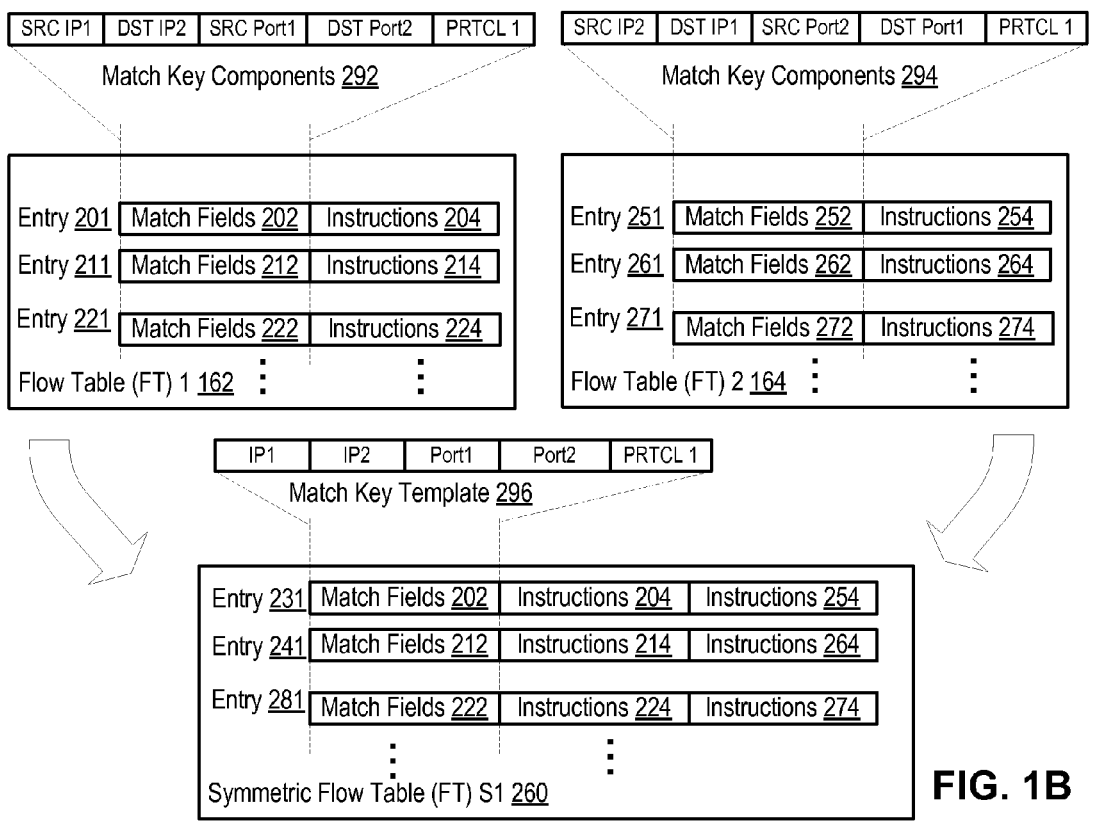
FIG. 1B illustrates flow table matching according to one embodiment of the invention.

FIG. 1B illustrates flow table matching according to one embodiment of the invention. Without embodiments of the invention, flow table 1 at reference 162 and flow table 2 at reference 164 can be created for packet forwarding of traffic flows 1 and 2 respectively. In flow table 1, match key components 292 includes an ordered 5-tuple of SRC IP1, DST IP2, SRC Port1, DST Port2, and PRCTL 1. Thus the values of IP1, IP2, Port1, Port2, and PRCTL 1 within a packet are extracted to compare with match fields 202, 212, and 222 of flow table entries 201-221. Upon a matching flow table entry is identified, the network element performs the corresponding set of instructions (e.g., instructions 204, 214, and 224) of the matching flow table entry on the packet. In flow table 2, match key components 294 includes an ordered 5-tuple of SRC IP2, DST IP1, SRC Port2, DST Port1, and PRCTL 1. It is to be noted that match key components 294 have the same components as match key components 292, and the difference is that the order of the source and destination IP addresses and ports are swapped. Thus entries 251, 261, and 271 in flow table 2 contain match fields 252, 262, and 272, which are same fields as match fields 202, 212, 222 of flow table 1, but the order of the source and destination IP addresses and ports are swapped. However, the instruction sets 254, 264, 274 are likely different from the instruction sets 204, 214, and 224. That is, the operations to be performed on packets of two flows at the opposite directions are different.

From flow tables 1 and 2, one may observe that the match fields are redundant between the flow tables as these flow tables are for flows of opposite directions. Since match fields generally take large amount of storage space (e.g., 5~259 bytes with match fields in OXM TLV format), the redundancy resulting storage waste due to symmetric match fields in different flow tables can be substantial. In addition, the network controller needs to communicate with network element 104 to create and maintain the flow tables containing the redundant match fields. The communication is through flow modification and/or removal messages between the network controller and the network elements, and it is advantageous to remove the redundancy in flow tables thus remove the unnecessary communication between the network controller and network elements such as network element 104 so that the SDN system may be scaled better.

With that in mind, embodiments of the invention utilize flow tables such as symmetric flow table S1 at reference 260. In a symmetric flow table, the match fields are intact (in comparing to a corresponding regular flow table where each flow table entry contains one set of instructions) but the match key components for the symmetric flow table are not determined until run time, when a packet is received. A symmetric flow table may utilize a match key template, through which the network element extracts values in a received packet without determining the values of the match key components. For example, match key template 296 contains symmetric components IP1 and IP2, Port1 and Port2. Instead of extracting IP1 value from the source IP address in the packet and IP2 value from the destination IP address in the packet as done for matching flow table 1 at reference 162, the network element determines which of the source and destination IP addresses are extracted as the values of IP1 and IP2 respectively. Similarly, the network element determines which of the source and destination ports are extracted as the values of Port1 and Port2 respectively. Once the values of IP1, IP2, Port1, Port2, and Protocol 1 extracted from the packet are determined, these values are used to match the match fields such as match fields 202, 212, and 222, which contains (Source MAC address, Destination MAC address, Source IP address, Destination IP address, Protocol) fields.

Since now packets of two different flows are to be matched against a single symmetric flow table 260, the flow table entries now contain two sets of instructions. The instructions 204, 214, and 224 are for packets of flows originally to be matched against flow table 1 at reference 162, and the instructions 254, 264, and 274 are for packets of flows originally to be matched against flow table 2 at reference 164. The selection of the sets of instructions may be designated using a flag. The flag may be used for matching the sets of instructions. For example, a flag may associated within each set of instructions (e.g., each set of instructions may be embedded with a flag), where the flag of each set of instructions is set when the flow table is generated. In alternate, the sets of instructions may contain no flag, but the sets of instructions are ordered in a predetermined fashion in a given flow table entry. For example, the first set of instruction is predetermined to store instructions to perform when the match key components are determined in one way (e.g., the matching is for flow 1 NE 102→NE 106), and the second set of instruction is predetermined to store instructions to perform when the match key components are determined in another way (e.g., matching is for flow 2 NE 106→NE 102). The determination of the values of match key components may be used to select the first or the second set sets of instructions.

Determination of Values of Symmetric Match Key Components

Figure 2:
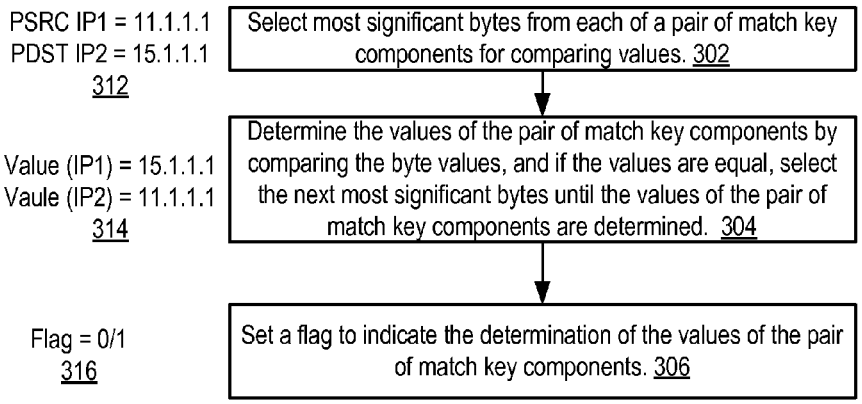
FIG. 2 is a flow diagram illustrating the determination of the values of symmetric match key components according to one embodiment of the invention.

As a symmetric flow table is used to forward packets of two different flows (e.g., flows of two opposite directions) to make flow processing more efficient within a SDN system, how to determine the values of symmetric match key components is important. The values of symmetric match components may be determined in a variety of ways. For example, the values of packet header fields other than the ones corresponding to the symmetric match components may be used. Embodiments of the invention determine the values of symmetric match key components based on the values themselves. FIG. 2 is a flow diagram illustrating the determination of the values of symmetric match key components according to one embodiment of the invention. The symmetric match key components are one or more pairs of match key components for matching a flow table. The operations in FIG. 2 may be performed by a network element (e.g., an OpenFlow switch).

The values of symmetric match components are first extracted from a packet to be forwarded by a symmetric flow table. Then at reference 302, for determining the values of the symmetric match components, the most significant bytes from each of a pair of match key components is compared. As illustrated, the packet has source IP address=11.1.1.1 and destination IP address=15.1.1.1, and the IP addresses are extracted from the packet as the match key components but without determining which IP address is to set to be the value of IP1 of the match key components. For determining the value of IP1, the byte values of the most significant bytes of the pair of match key components are compared, and the larger value is to be the value of IP1 in this example. If the byte values of the most significant bytes of the pair are equal, the next most significant bytes of the pair of match key components are compared until the larger value is determined and IP1 is determined at reference 304. Here the destination IP address=15.1.1.1 is set to be the value of IP1 and source IP address=11.1.1.1 is set to be the value of IP2. Thus, for matching the corresponding symmetric flow table, the match key components are {15.1.1.1, 11.1.1.1}. Based on the determination of the match key components, at reference 306, a flag is set to indicate the determination of the values of the pair of match key components. It is noted that a pair of symmetric match key components does not have the same value, otherwise they are not used for making the determination of the values of the match key components of a key for the flow table.

The flag may contain one bit to indicate the single determination of IP addresses. For example, if the exacted IP addresses maintain their original order in the packet when they are assigned to be the value of the match key components, the flag may set to be zero, indicating no change of order of the packet values in matching the symmetric flow table; otherwise the flag may be set to one, indicating the swap of packet values in matching the symmetric flow table. It is to be noted that the flag value may be different—e.g., one may indicate no change of order of the packet values in matching the symmetric flow table.

The flag may be associated with the packet during the processing of the packet by the symmetric flow table (e.g., attached to be a part of the packet like metadata). When a matching flow table entry is identified, the flag is used to determine which set of instructions to perform upon the packet. As discussed herein above, each set of instructions may be associated with a flag (e.g., the flag being embedded within the set of instructions), or the sets of instructions are ordered in a predetermined way so that based on the flag associated with the packet, the network element may select the set of instructions based on the flag. For example, when the flag value is zero, the first set of instructions is to be performed upon the packet; when the flag value is one, the second set of instructions is to be performed upon the packet.

Figure 3:
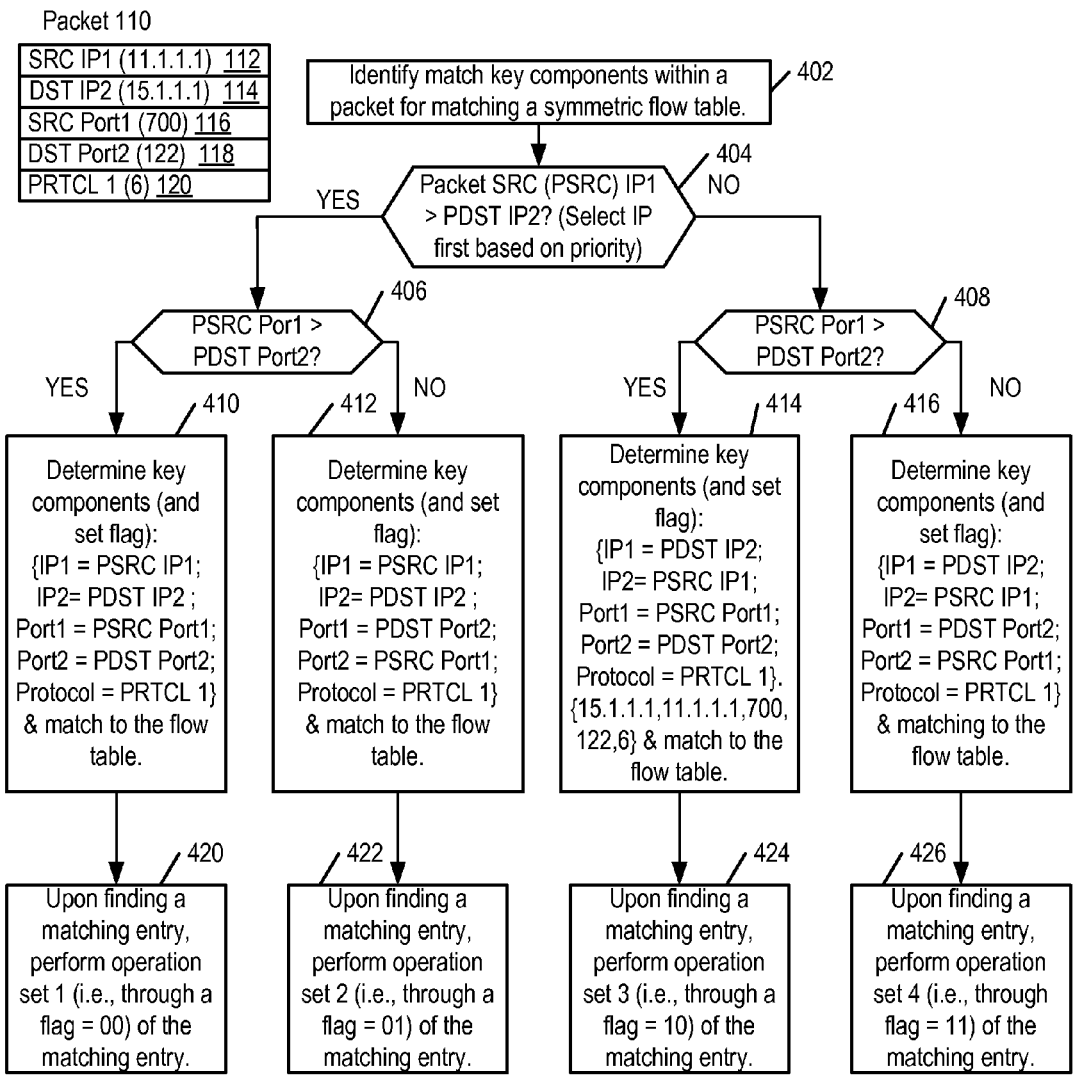
FIG. 3 is a flow diagram illustrating the determination of the values of a plurality of symmetric match key components according to one embodiments of the invention.

The determination of values of symmetric match key components is not limited when the match key components contain only one pair of symmetric match key components. As discussed herein above, a key for a flow table may contain more than one pair of symmetric match key components. FIG. 3 is a flow diagram illustrating the determination of the values of a plurality of symmetric match key components according to one embodiments of the invention. The operations in FIG. 3 may be performed by a network element (e.g., an OpenFlow switch).

At reference 402, the match key components are identified within a packet for matching a symmetric flow table. The identified match key components include all the match key components of the key for matching the symmetric flow table. However, the values of the match key components for matching the symmetric flow table is not determined at the time. The match key components of the key contains a plurality of pairs of symmetric match key components. In this example, one pair is the source and destination IP addresses, and the other pair is the source and destination ports.

At reference 404, the values of source and destination IP addresses are compared. When there are a plurality of pairs of symmetric match key components, the pairs are compared in a predetermined order. The predetermined order is based on the priority of the different match key components. In one embodiment, the network element performing the comparison make the IP addresses (IPv4 or IPv6) the highest priority, MAC addresses the next highest priority, and ports the next. The order of priority may be predetermined by the network controller, but it may also be configured by the network element. Once the priority is determined, the network element checks the match key components in the order, if there is a pair of IP addresses in the match key components, their values are used to determine the values of match key components first; if there is no pair of IP addresses, the network element checks if there is a pair of MAC addresses and so on. In this example, the packet is packet 110 and it contains source IP address=11.1.1.1, destination IP address=15.1.1.1, source port=700, destination port=122, and protocol=6 as illustrated at references 112-120.

When the packet source IP address is larger than the destination IP address (e.g., based on the byte value comparison), the flow goes to reference 406, where the packet source port is compared to the packet destination port. If the value of packet source port is larger than that of the destination port, the flow goes to reference 410, where values of the match key components are determined: IP1=packet source IP address, IP2=destination source address, port1=packet source port, port2=packet destination port, and protocol=protocol 1. Note that the protocol field is within the match key components of the key, but it is not within any pair of match key components, thus its value is the value extracted from the packet without any determination. In one embodiment, a flag is set to designate the determination.

With the values of match key components being determined for the packet, the network element may search for a matching flow table entry within the symmetric flow table. Upon finding the matching flow table entry within the symmetric flow table, the network element selects a corresponding set of instructions within a plurality of sets of instructions to perform operations upon the packet at reference 420. Note the selection of the set of instructions may be based on the designated flag (e.g., flag=00). In this example, because there are two pairs of match key components (IP addresses and ports), the flag needs to contain at least two bits to indicate which of the four sets of instructions is for the packet in the matching entry.

Reference 408 performs operations similar to reference 406; references 412-416 perform operations similar to references 410; and references 422-426 perform operations similar to references 420. Thus, the operations within these references are not repeated.

For packet 110, based on the values of the symmetric match flow components, the flows goes to references 414 and 424, where IP1=15.1.1.1, IP2=11.1.1.1, port1=700, port2=122, and protocol=6 as indicated at reference 414. In this example, the third set of instructions out of four sets of instructions are performed on packet 110 as in reference 424.

With embodiments of the technique, a single symmetric flow table not only may accommodate packet processing for flows from two opposite directions (as shown in FIG. 2), but also accommodate packet processing for flows for four (as shown in FIG. 3), eight, or more directions with different symmetric match key components. Using the single symmetric flow tables and different match key components based on the values within packet, a network element may generate much less flow tables, and the network controller will be required to store and communicate much less information for the network element. The saving in storage space in both the network controller and network elements, and the saving in communications between two parties will make the SDN system scales much better.

Symmetric Flow Processing

Figure 4:
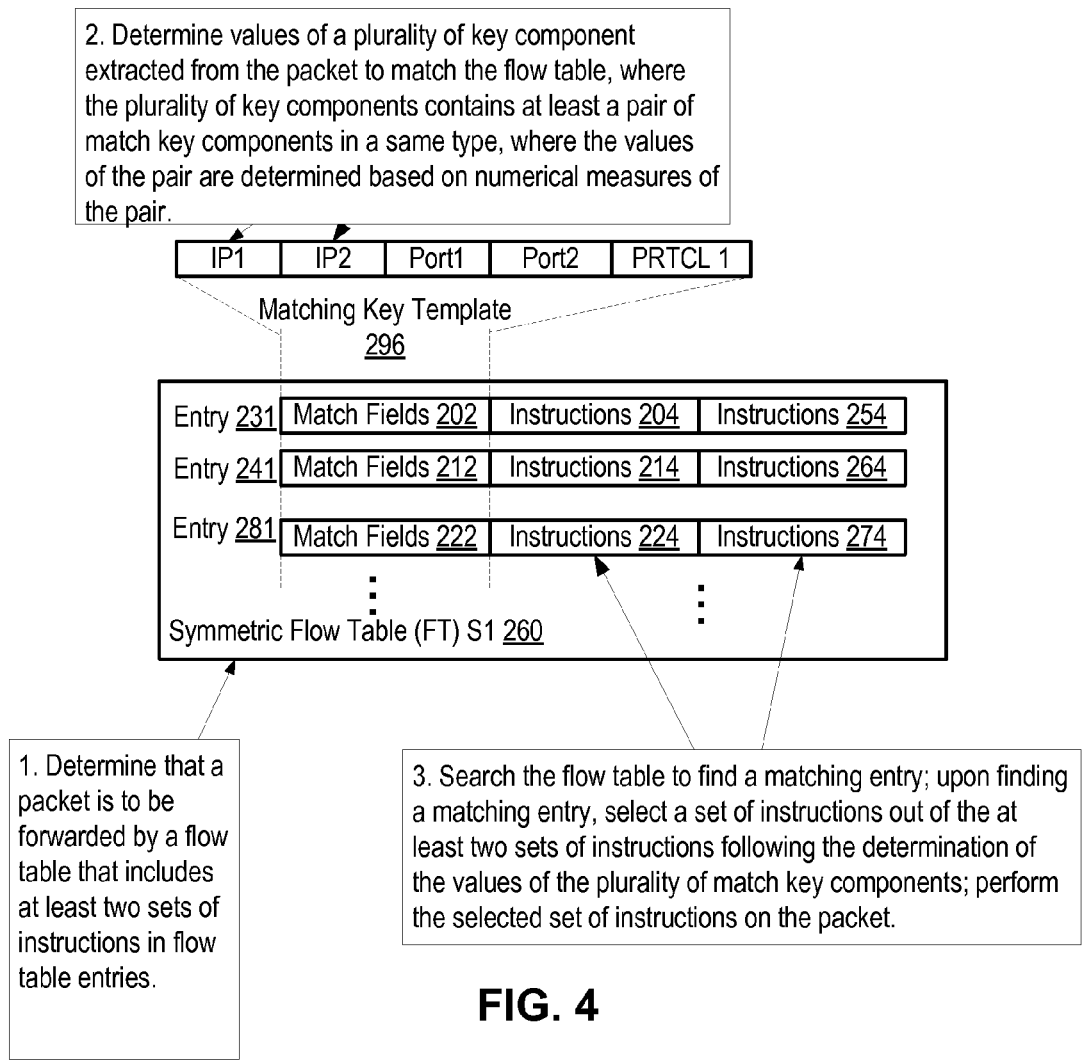
FIG. 4 illustrates symmetric flow processing within a network element according to one embodiment of the invention.

FIG. 4 illustrates symmetric flow processing within a network element according to one embodiment of the invention. Task boxes 1 to 3 illustrate the order in which operations are performed according to one embodiment of the invention.

At task box 1, the network element determines that a packet is to be forwarded by a flow table that includes at least two sets of instructions in flow table entries for matching packets. The flow table (referred to as the symmetric flow table herein above) may contain more than two sets of instructions as discussed in relation to FIG. 3. It is to be noted that the flow table may be the first flow table of the network element, in which case the packet is received from another network element. The flow table may also be in the middle or end of a flow table chain, where the earlier flow tables include only a single set of instructions for each flow table entry.

At task box 2, the network element determines values of a plurality of match key components within the packet to match the flow table, where the plurality of match key components contains at least a pair of match key components in the same type, where the values of the pair are determined based on numerical measures of the pair. The flow table is to be looked up using a key that includes the plurality of match key components. The plurality of match key components may include IP addresses (IPv4 or IPv6), MAC addresses, TCP/UDP ports, protocol types, VLAN IDs, etc. The plurality of match key components includes one or more pairs of match key components, where each pair is two match key components in the same data type (e.g., IP addresses, MAC addresses, TCP/UDP ports, VLAN IDs) but may have different values within the packet (referred to as symmetric match key components). A numerical measure of each of the pair or pairs is determined (e.g., through converting the symmetric match key components to one or more numbers such as illustrated in FIG. 2). The numerical measures of the one or more pair of match key components themselves are used to determine the values of the one or more pairs. The values of the rest of the plurality of match key components are determined as known in the art, e.g., extracting from the packet the value of a field that corresponds to the match key components such as protocol type field in the packet is extracted to be the value of the protocol type in the plurality of the match key components. Once the values of the match key components are determined, a flag is set to designate the determination in one embodiment.

FIGS. 2 and 3 illustrate ways to use the relative values of the pairs of match key components, where the values extracted from the packet are compared after converting to the numerical measures and then depending on the relative values, the values are set to the match key components to match the flow table. The comparison of values may also be simplified by comparing only a portion of the value, for IP addresses, the subnet values may be used for comparing two match key component instead of the IP address itself (e.g., instead of comparing 11.1.1.1 and 15.1.1.1, one may compare only the subnet 11.255.255.255 and 15.255.255.2555, thus only the subnets are compared). The values may also be set by absolute values, i.e., using the value of one of the pair (e.g., byte value converts to decimal value) in the packet to determine the match key component. For example, if the IP address value >12.1.1.1, the IP address value is for the source IP address in the key to match the flow table.

At task box 3, the network element searches the flow table to find a matching entry; upon finding a matching entry, it select a set of instructions out of the at least two sets of instructions following the determination of the values of the plurality of match key components; and it performs the selected set of instructions on the packet. The selection following the determination of the values of the plurality of match key components may be performed by checking the flag designating the determination. Each of the at least two sets of instructions may have a flag value associated to the set (i.e., the flag with a value may be embedded in the set of instruction), and the selection is to match the set flag with the flag associated with the set.

It is to be noted that when the set of instructions is performed on the packet, the counters of the flow table entry are updated, associated with the set of instruction. The counters may have multiple sets, and each set corresponds to one set of instructions. In addition, when no matching flow table entry is found, the operations in the network element and the communications between the network element and the network controller are similar to what is known in the art, such as defined as in the OpenFlow protocol.

Flow Diagram

Figure 5:
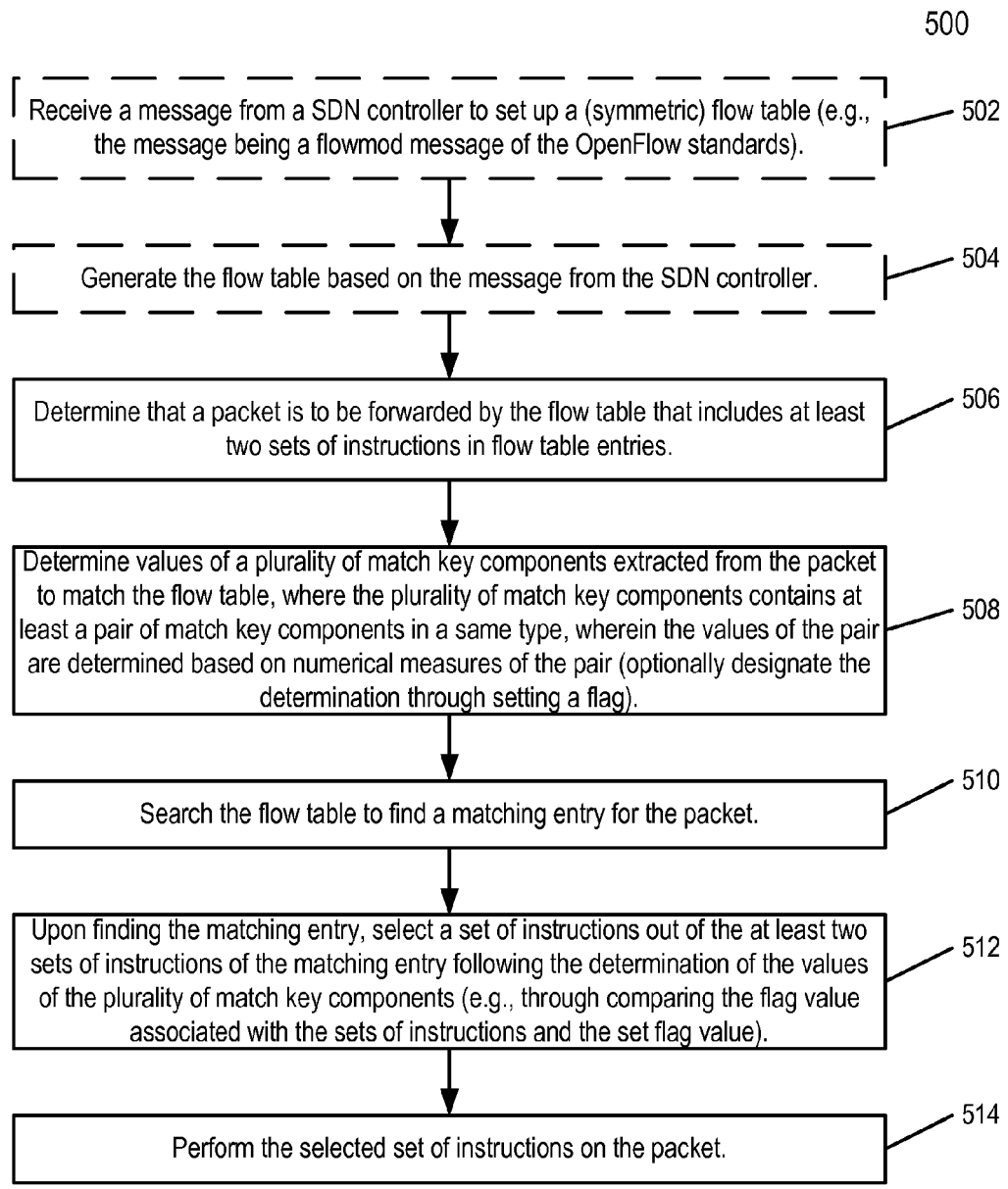
FIG. 5 is a flow diagram illustrating operations of symmetric flow processing according to one embodiment of the invention.

FIG. 5 is a flow diagram illustrating operations of symmetric flow processing according to one embodiment of the invention. Method 500 may be implemented in a network device, which implements a network element such as network element 104 of FIG. 1, where the network device is coupled to a network containing a SDN controller such as network controller 150, and a set of network devices implementing network elements.

Method 500 optionally starts at reference 502, where the network element receives a message from the SDN controller to set up a flow table. The flow table is to include at least two sets of instructions in flow table entries for matching packets. In one embodiment, all the flow table entries contain the at least two sets of instructions, while in an alternative embodiment, only a portion of the flow table entries contain the at least two sets of instructions. The message is a flow-mod request in compliance with the OpenFlow protocols. The flow-mod request may begin with the standard OpenFlow header, containing the appropriate version and type values, followed by the flow-mod structure. A flow-mod request may contain cookie identifier (ID), flow timeout values, OXM match fields, flow instructions. In one embodiment, the flow instruction is marked with a flag as discussed herein above. It is noted that the flow table may contain other entities defined in the OpenFlow protocols (e.g. table miss instructions to handle when no entry matches an incoming packet) as well.

At reference 504, the network element generates the flow table that includes that at least two sets of instructions in flow table entries for matching packets based on the received message. The flow table may be generated with a specific designation to indicate that it is a flow table that includes the—at least two sets of instructions in flow table entries (i.e., a symmetric flow table), so that the network element and the SDN controller may keep track of the status of this type of flow tables within the network element and within the whole network. When the flow instruction is marked with a flag, the flag may be kept within the generated set of instructions. In an alternative embodiment, the flag is utilized to organize the plurality of sets of instructions within the flow table entries. For example, the flag may be used to order the plurality of sets of instructions so that the order of a set within the plurality of sets indicates the marked flag value from the flow-mod request.

At reference 506, it is determined that a packet is to be forwarded by the flow table. The operations of this step is discussed in relation to task box 1. At reference 508, values of a plurality of match key components extracted from the packet to match the flow table are determined, where the plurality of match key components contains at least a pair of match key components in a same type, where the values of the pair are determined based on numerical measures of the pair. The operations of this step is discussed in relation to task box 2.

It is to be noted that when the plurality of match key components includes a plurality of pairs of match key components, each pair is assigned to a priority, and the selection of the one of the at least two sets of instructions follows a priority order of the pairs. For example, in the example of FIG. 3, the IP address has a higher priority than the port number, thus the selection is to determine the values of the IP addresses of the match key components first and then the port numbers of the match key components. It is to be noted that different priorities including different types of match key components are possible following the principle of embodiments of the invention.

At reference 508, the flow table is searched to find a matching entry for the packet. The matching is based on the determined values of the plurality of match key components. At reference 510, upon finding the matching entry, a set of instruction out of the at least two sets of instruction of the matching entry is selected, following the determination of the values of the plurality of match key components. In one embodiment, the selection is through comparing the flag value associated with the sets of instruction and the flag value set during the determination of the values of the plurality of match key components.

Embodiments of the invention receives the message from the SDN controller to set up the symmetric flow table, thus the SDN controller may be notified that the network element has the capability to generate the symmetric flow table. The notification is particularly necessary when the SDN controller and the network devices implementing the network elements are made by different vendors. One or more ways may be utilized to identify the network element implemented by a network device with the capability:

The network element may negotiate with the network controller and indicate its capability of symmetric flow processing.

A vendor extension may be added in communications between the network element and the network controller so that the network controller may recognize the vendor extension and know the network element's capability.

A predetermined data path identifier is assigned for the network element with the capability.

The network element may initiate communication through a predetermined port to the SDN controller.

SDN and NFV Environment Utilizing Embodiments of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figures 6A, 6B:
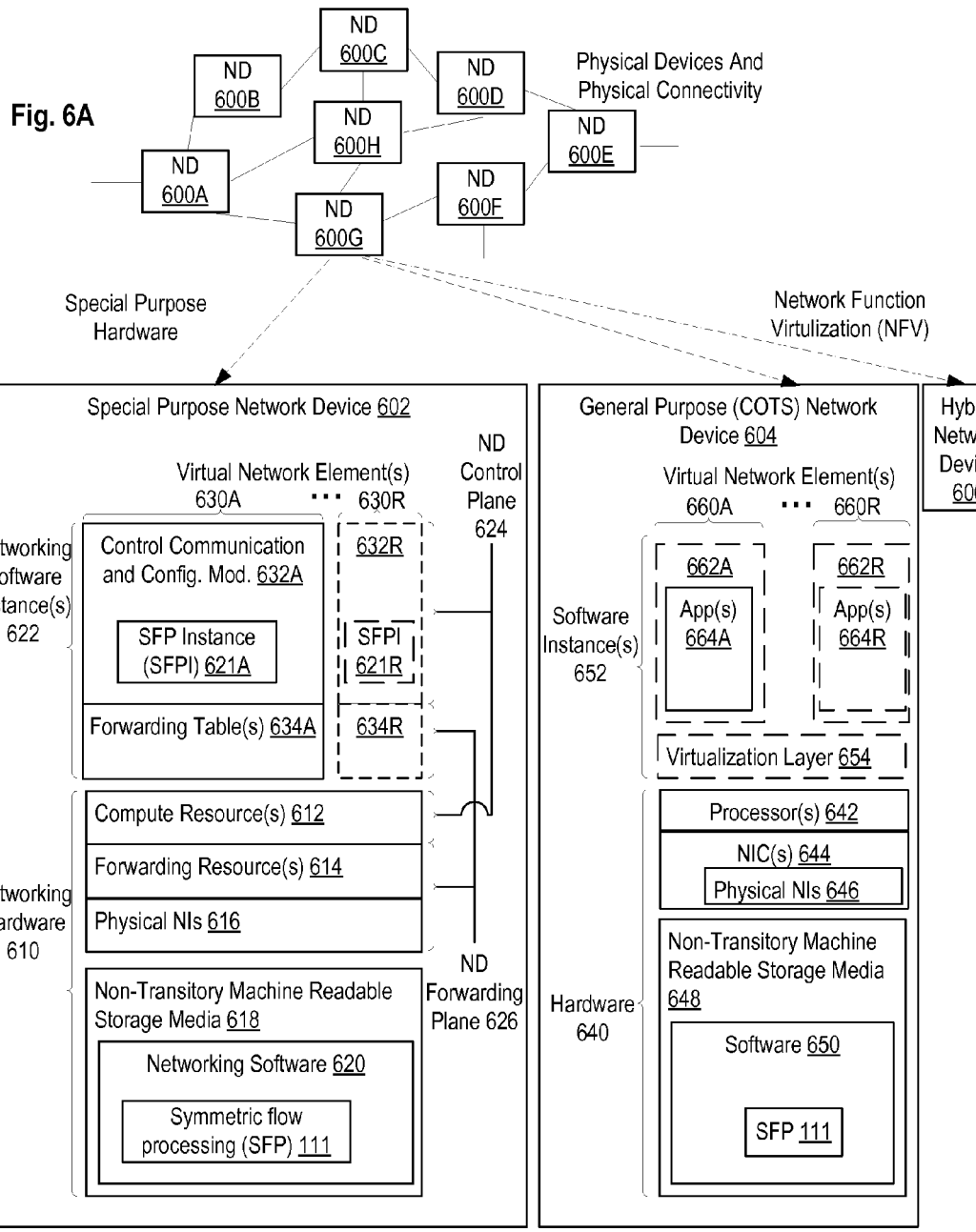
FIG. 6A illustrates connectivity between network devices (NDs) within an exemplary network, as well as three exemplary implementations of the NDs, according to some embodiments of the invention.
FIG. 6B illustrates an exemplary way to implement a special-purpose network device according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620, which contains symmetric flow processing (SFP) module 111 containing instructions for the operations of symmetric flow processing as discussed herein above. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the SFP module 111 may be executed by the networking hardware 610 to instantiate a set of one or more SFP instances 621A-R. Each of the SFP instances 621A-R, and that part of the networking hardware 610 that executes that SFP instance (be it hardware dedicated to that load balancer instance and/or time slices of hardware temporally shared by that load balancer instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). It is to be noted that the forwarding tables 634A-634R include the flow tables that include at least two sets of instructions in flow table entries for matching packets (symmetric flow tables) discussed herein above.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650, which contains symmetric flow processing (SFP) module 111. During operation, the processor(s) 642 execute the software 650 to instantiate one or more sets of one or more applications 664A-R, including instances of SFP module 111. While one embodiment does not implement virtualization, alternative embodiments may use different forms of virtualization—represented by a virtualization layer 654 and software containers 662A-R. For example, one such alternative embodiment implements operating system-level virtualization, in which case the virtualization layer 654 represents the kernel of an operating system (or a shim executing on a base operating system) that allows for the creation of multiple software containers 662A-R that may each be used to execute one of the sets of applications 664A-R. In this embodiment, the multiple software containers 662A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 654 represents a hypervisor (sometimes referred to as a virtual machine monitor (VMM)) or a hypervisor executing on top of a host operating system; and 2) the software containers 662A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 664A-R, as well as the virtualization layer 654 and software containers 662A-R if implemented, are collectively referred to as software instance(s) 652. Each set of applications 664A-R, corresponding software container 662A-R if implemented, and that part of the hardware 640 that executes them (be it hardware dedicated to that execution and/or time slices of hardware temporally shared by software containers 662A-R), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 662A-R differently. For example, while embodiments of the invention are illustrated with each software container 662A-R corresponding to one VNE 660A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of software containers 662A-R to VNEs also apply to embodiments where such a finer level of granularity is used.

In certain embodiments, the virtualization layer 654 includes a virtual switch that provides similar forwarding services as a physical Ethernet switch. Specifically, this virtual switch forwards traffic between software containers 662A-R and the NIC(s) 644, as well as optionally between the software containers 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 6C:
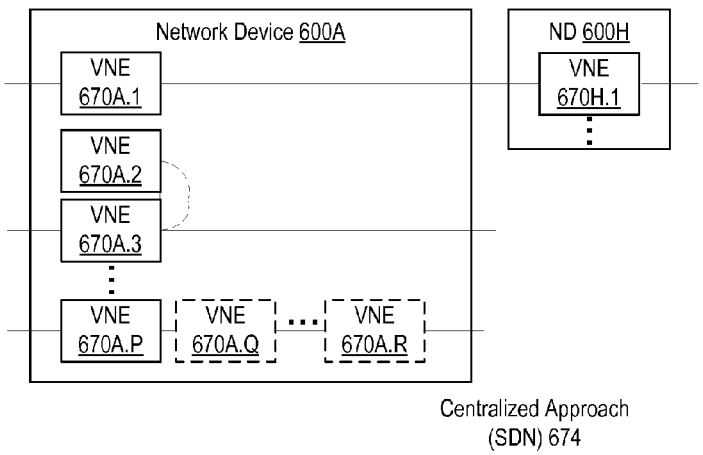
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software containers 662A-R may operate as servers; the same would be true for the hybrid network device 606; in the case of the special-purpose network device 602, one or more such servers could also be run on a virtualization layer executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on an ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
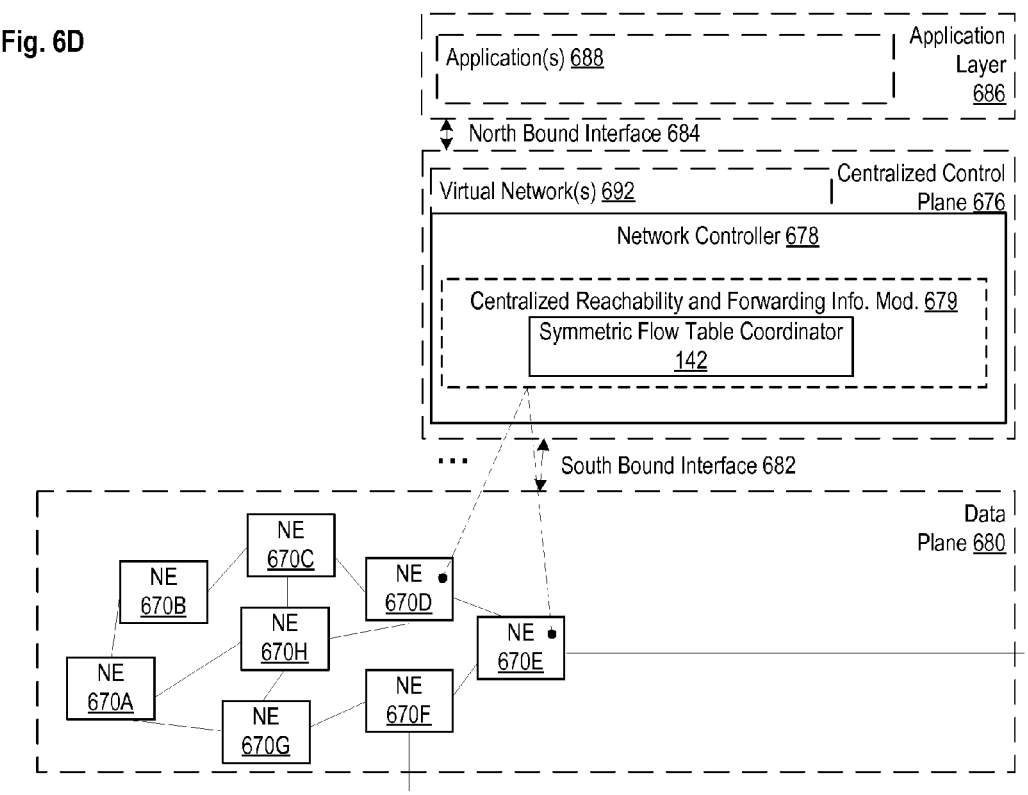
FIG. 6D illustrates a network with a single network element (NE) on each of the NDs, and with a centralized approach for maintaining reachability and forwarding information (also called network control), according to some embodiments of the invention.

FIG. 6D illustrates a network with a single network element on each of the NDs of FIG. 6A according to some embodiments of the invention. FIG. 6D illustrates network elements (NEs) 670A-H with the same connectivity as the NDs 600A-H of FIG. 6A.

FIG. 6D illustrates a network with a single network element on each of the NDs of FIG. 6A, and with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs. The centralized reachability and forwarding information module 679 contains a symmetric flow table coordinator 142. Symmetric flow table coordinator 142 coordinates generating and updating of symmetric flow tables in network elements 670A-670H. In one embodiment, symmetric flow table coordinator 142 sends flow-mod requests to the network elements for generating and updating of symmetric flow tables as discussed herein above.

Where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
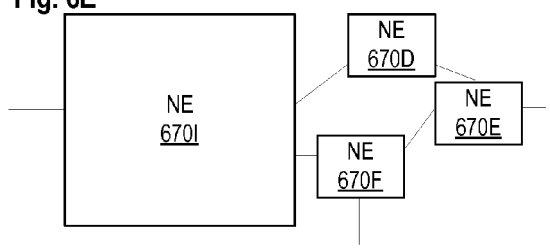
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
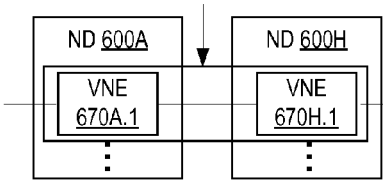
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 976 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The operations of the flow diagram FIGS. 2, 3, and 5 are described with reference to the exemplary embodiment of FIGS. 1A and 6. However, it should be understood that the operations of flow diagrams can be performed by embodiments of the invention other than those discussed with reference to the exemplary embodiment of FIGS. 1A and 6, and the exemplary embodiment of FIGS. 1A and 6 can perform operations different than those discussed with reference to the flow diagrams of FIGS. 2, 3, and 5.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network device coupled to a software-defined networking (SDN) system, wherein the SDN system contains a SDN controller managing the network device, the method comprising:
   determining that a packet is to be forwarded by a flow table that includes at least two sets of instructions for match fields in entries of the flow table;

determining values of a plurality of match key components extracted from the packet to match the values of the plurality of the match key components against the entries of the flow table, wherein the plurality of the match key components contains at least a pair of the match key components in a same type, wherein values of the pair of the match key components are determined based on numerical measures of the pair of the match key components;

searching the flow table to find a matching entry for the values of the plurality of the match key components of the packet;

upon finding the matching entry for the values of the plurality of the match key components of the packet, selecting one of the at least two sets of instructions of the matching entry following the determination of the values of the plurality of the match key components;

performing the selected one of the at least two sets of instructions on the packet; and forwarding the packet by the flow table based on the selected one of the at least two sets of instructions.

2. The method of claim 1, wherein the determining the values of the plurality of the match key components comprises:
designating the determination through setting a flag, and using the flag to select the one of the at least two sets of instructions for the packet upon finding the matching entry.

3. The method of claim 2, wherein each set of the at least two sets of instructions is associated with a flag value, and wherein the flag value of the each set of the at least two sets of instructions is compared to the flag set upon the determination of the values of the plurality of the match key components.

4. The method of claim 1, wherein the plurality of the match key components include a plurality of pairs of the match key components, wherein each pair is assigned to a priority, and wherein the selection of the one of the at least two sets of instructions follows a priority order of the pairs of the match key components.

5. The method of claim 1, wherein the same type of the pair of the match key components is an Internet Protocol (IP) address.

6. The method of claim 1, wherein the same type of the pair of the match key components is a media access control (MAC) address or a virtual local area network identifier (VLAN ID).

7. The method of claim 1, the method further comprising:
receiving a message from the SDN controller to set up the flow table; and
generating the flow table based on the message.

8. The method of claim 7, wherein the message is a flow-mod request in compliance with the OpenFlow protocols.

9. A network device coupled to a software-defined networking (SDN) system, wherein the SDN system contains a SDN controller managing the network device, the network device comprising:
a processor and a non-transitory machine-readable storage medium coupled to the processor, the non-transitory machine-readable storage medium containing operations executable by the processor, wherein the network device is operative to:
determine that a packet is to be forwarded by a flow table that includes at least two sets of instructions for match fields in entries of the flow table;
determine values of a plurality of match key components extracted from the packet to match the values of the plurality of the match key components against the entries of the flow table, wherein the plurality of the match key components contains at least a pair of the match key components in a same type, wherein values of the pair of the match key components are determined based on numerical measures of the pair of the match key components;
search the flow table to find a matching entry for the values of the plurality of the match key components of the packet;
upon finding the matching entry for the values of the plurality of the match key components of the packet, select one of the at least two sets of instructions of the matching entry following the determination of the values of the plurality of the match key components;
perform the selected one of the at least two sets of instructions on the packet; and
forward the packet by the flow table based on the selected one of the at least two sets of instructions.

10. The network device of claim 9, wherein the determination of the values of the plurality of the match key components is to designate the determination through setting a flag, and using the flag to select the one of the at least two sets of instructions for the packet upon finding the matching entry.

11. The network device of claim 10, wherein each set of the at least two sets of instructions is associated with a flag value, and wherein the flag value of the each set of the at least two sets of instructions is compared to the flag set upon the determination of the values of the plurality of the match key components.

12. The network device of claim 9, wherein the plurality of the match key components include a plurality of pairs of the match key components, wherein each pair is to be assigned to a priority, and wherein the selection of the one of the at least two sets of instructions follows a priority order of the pairs of the match key components.

13. The network device of claim 9, the network device is further operative to:
receive a message from the SDN controller to set up the flow table, and
generate the flow table based on the message.

14. The network device of claim 13, wherein the message is a flow-mod request in compliance with the OpenFlow standards.

15. A non-transitory machine-readable storage medium having instructions stored therein, which when executed by a processor, cause the processor to perform operations in a network device coupled to a software-defined networking (SDN) system, wherein the SDN system contains the network device and a SDN controller managing the network device, the operations comprising:
determining that a packet is to be forwarded by a flow table that includes at least two sets of instructions for match fields in entries of the flow table;
determining values of a plurality of match key components extracted from the packet to match the values of the plurality of the match key components against the entries of the flow table, wherein the plurality of the match key components contains at least a pair of the match key components in a same type, wherein values of the pair of the match key components are determined based on numerical measures of the pair of the match key components;

searching the flow table to find a matching entry for the values of the plurality of the match key components of the packet;

upon finding the matching entry for the values of the plurality of the match key components of the packet, selecting one of the at least two sets of instructions of the matching entry following the determination of the values of the plurality of the match key components;

performing the selected one of the at least two sets of instructions on the packet; and forwarding the packet by the flow table based on the selected one of the at least two sets of instructions.

16. The non-transitory machine-readable storage medium of claim 15, wherein the determining the values of the plurality of the match key components comprises:

designating the determination through setting a flag, and using the flag to select one of the at least two sets of instructions for the packet upon finding the matching entry.

17. The non-transitory machine-readable storage medium of claim 16, wherein each set of the at least two sets of instructions is associated with a flag value, and wherein the flag value of the each set of the at least two sets of instructions is compared to the flag set upon the determination of the values of the plurality of the match key components.

18. The non-transitory machine-readable storage medium of claim 15, wherein the plurality of the match key components includes a plurality of pairs of the match key components, wherein each pair is assigned to a priority, and wherein the selection of the one of the at least two sets of instructions follows a priority order of the pairs of the match key components.

19. The non-transitory machine-readable storage medium of claim 15, wherein the same type of the pair of the match key components is an Internet Protocol (IP) address.

20. The non-transitory machine-readable storage medium of claim 15, wherein the same type of the pair of the match key components is a media access control (MAC) address or a virtual local area network identifier (VLAN ID).

* * * * *